No. 882,558. PATENTED MAR. 24, 1908.
C. A. GIBBS.
AIR AND WATER HEATING FURNACE.
APPLICATION FILED MAY 11, 1907.

3 SHEETS—SHEET 1.

Witnesses
C. E. Smith.
Geo. E. Jew.

Inventor
Clarence A. Gibbs
By Milo B. Stevens & Co.
Attorneys

No. 882,558. PATENTED MAR. 24, 1908.
C. A. GIBBS.
AIR AND WATER HEATING FURNACE.
APPLICATION FILED MAY 11, 1907.
3 SHEETS—SHEET 2.
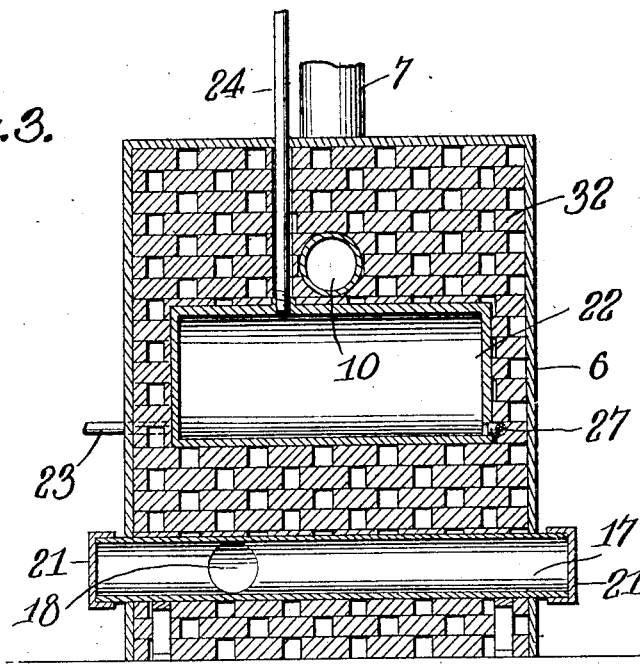
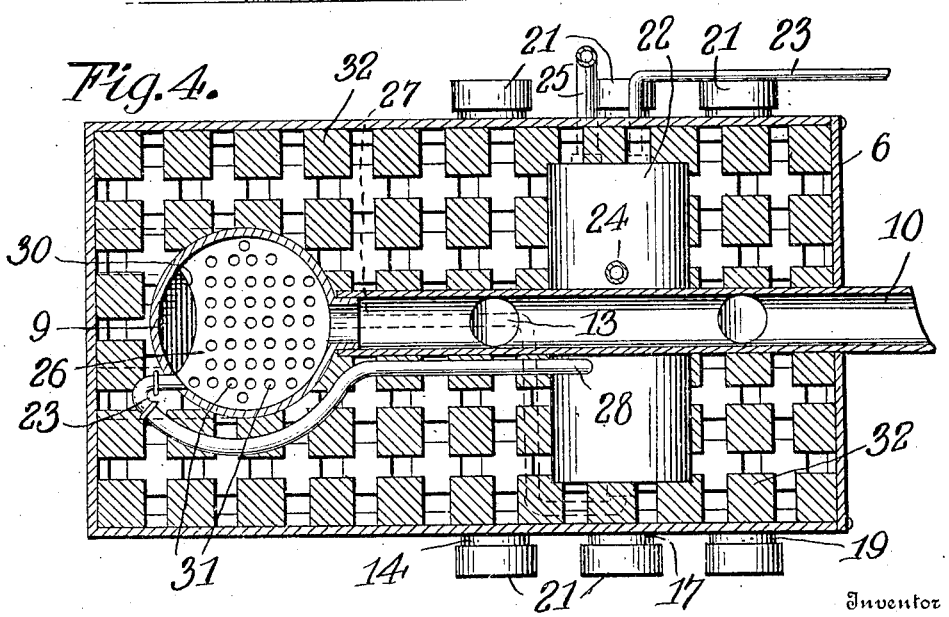

No. 882,558. PATENTED MAR. 24, 1908.
C. A. GIBBS.
AIR AND WATER HEATING FURNACE.
APPLICATION FILED MAY 11, 1907.

3 SHEETS—SHEET 3.

Clarence A. Gibbs,
Inventor

UNITED STATES PATENT OFFICE.

CLARENCE A. GIBBS, OF WILLIAMSPORT, PENNSYLVANIA.

AIR AND WATER HEATING FURNACE.

No. 882,558.　　　　Specification of Letters Patent.　　　Patented March 24, 1908.

Application filed May 11, 1907. Serial No. 373,059.

*To all whom it may concern:*

Be it known that I, CLARENCE A. GIBBS, a citizen of the United States, residing at Williamsport, in the county of Lycoming and State of Pennsylvania, have invented certain new and useful Improvements in Air and Water Heating Furnaces, of which the following is a specification.

This invention is a combined air and water heating furnace, and is designed particularly for use in connection with systems utilizing both hot air and hot water for heating purposes; or, the hot air may be utilized for heating and the hot water for both heating and hot water service purposes, or for either alone.

The invention embodies a furnace in which the fire box or furnace proper communicates with flue pipes extending through a secondary heating chamber which also contains a water tank, and said water tank is connected to a section or hollow casing which is located within the dome of the furnace, directly above the fire pot. Said casing is also constructed and located to act as a baffle or check plate for the combustible gases, being provided with a number of openings or pipe sections extending therethrough, and the gas evolved from the fuel is checked thereby, and, feeding through the holes, is burned above the same, whereby a complete combustion and a very hot fire are obtained. In addition, therefore, to its water heating function, the plate acts as an economizer and gas check and distributer which materially increases the fuel efficiency.

The water tank is supported and surrounded in the secondary heating chamber by means of checker brick work which is built up completely around the same, within the outer casing of the structure. This checker brick work absorbs the heat from the flues, and will retain the same for a considerable period of time, thereby serving to equalize the supply of heated air and to furnish a practically uniform supply thereof irrespective of the especial state of the fire, as well as to prevent rapid cooling of the water in the water tank.

Various other advantages of construction will be apparent from the following description.

Figure 1:
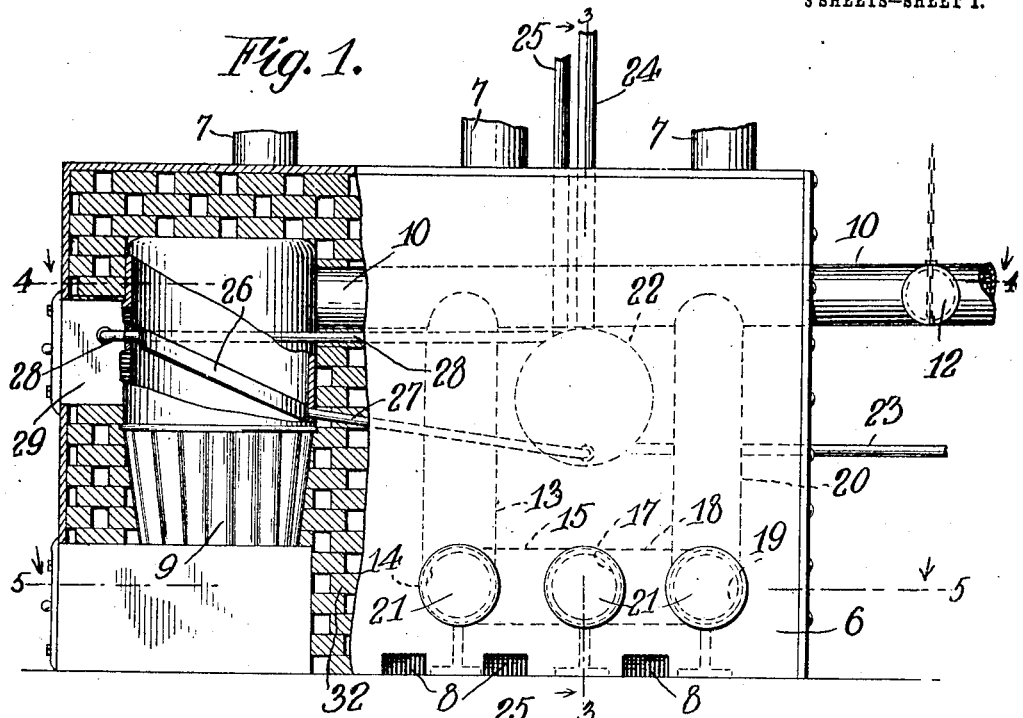
Figure 2:
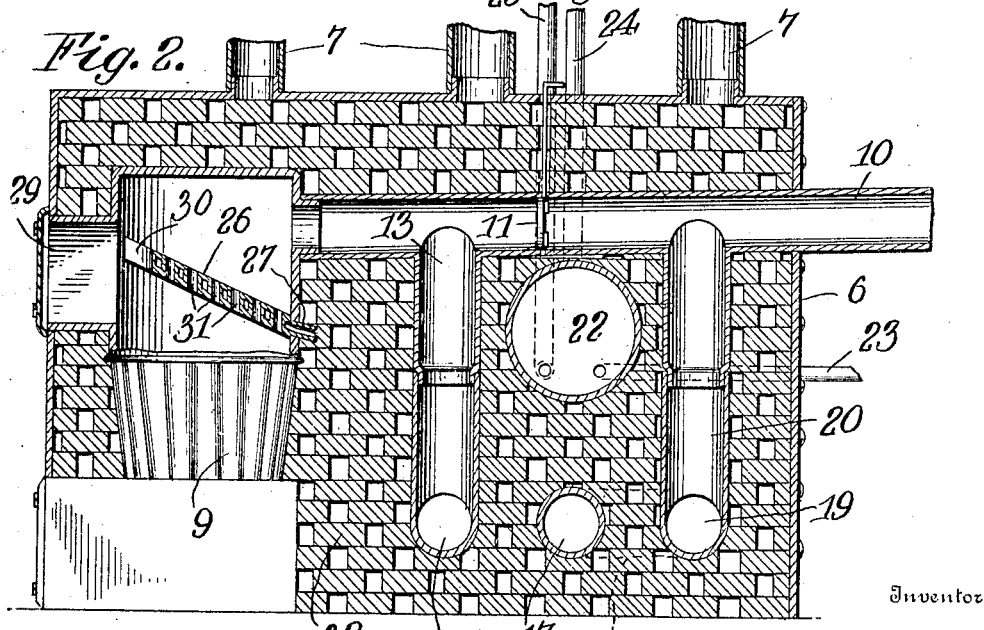
Figure 5:
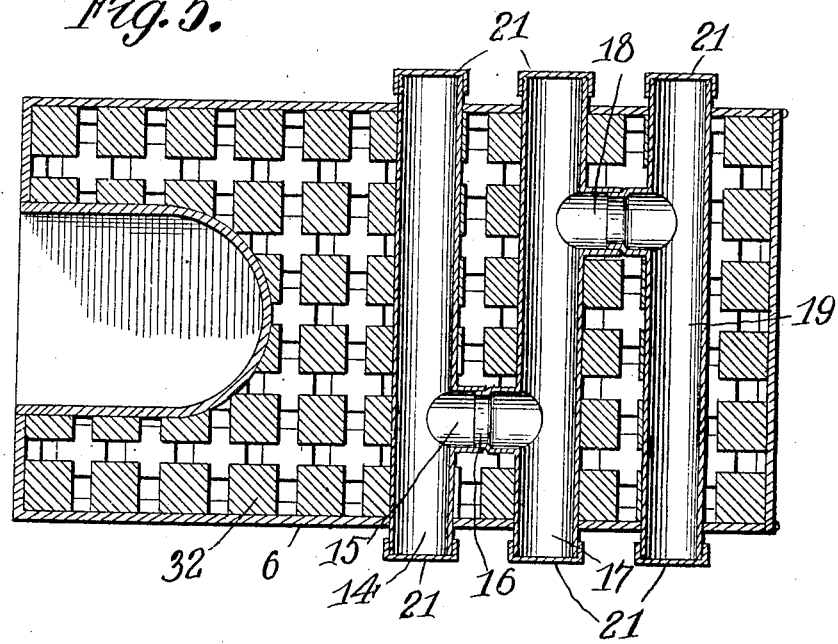
Figure 6:
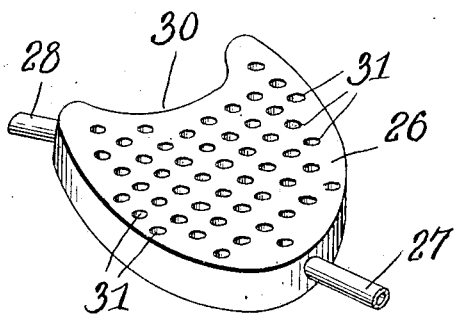

In the accompanying drawings, Figure 1 is a side elevation, partly in section, of the furnace. Fig. 2 is a central vertical longitudinal section. Fig. 3 is a section on the line 3—3 of Fig. 1. Fig. 4 is a section on the line 4—4 of Fig. 1. Fig. 5 is a section on the line 5—5 of Fig. 1. Fig. 6 is a perspective view of the water heating plate or section and gas check.

Referring specifically to the drawings, 6 indicates an outer casing constructed of galvanized iron or the like and having hot air service pipes 7 extending from the top thereof and air inlet openings 8 in the side at the bottom thereof. This casing incloses a fire pot or combustion chamber 9, provided with the usual grate, ash pit and accessory parts to form a fuel burner or furnace proper. This fire box is located in the front or forward part of the casing, and has extending rearwardly therefrom a direct smoke flue 10 controlled by a damper 11 and check 12. The said flue connects with a tortuous or indirect flue or set of flues located within the rear part of the furnace casing and forming a secondary heating chamber. The indirect flue has a pipe 13 extending downwardly from the flue 10 and connected to the middle of a horizontal cross flue 14 located in the lower part of the structure. This flue 14 is connected by a short horizontal flue 15, having a sliding joint 16, with an intermediate horizontal flue 17 which is connected near its opposite end, by a short horizontal flue 18, with a horizontal cross flue 19 from the middle of which extends an up flue 20 to the direct draft pipe 10. The indirect flow of the products of combustion is down through the pipe 13 and back and forth through the pipes 14, 17 and 19 and up through the pipe 20. The horizontal flues 14, 17 and 19 project through the side walls of the casing and are provided with caps 21 which may be removed to allow the flues to be cleaned out, which can be very readily done by passing a scraper or brush therethrough. The various pipes or flues may be made in sections for the purpose of convenient separation or assembly.

The water heating appliances include a tank 22 which is located within the secondary heating chamber in the rear part of the structure and which extends horizontally across the same between the pipes 13 and 20 at the front and rear and the pipes 10 and 17 above and below. This tank receives a supply of cold water from the main through a pipe 23, and has a service pipe 24 extending from the top thereof, as well as a return pipe 25 entering at one end near the bottom thereof. The pipes 24 and 25 may be connected to the radiators and other appliances or an ordinary hot water heating system, a particular description or illustration of which is not essential. The tank is furthermore connected to a water heating plate or hollow casting 26 which is located within the dome or above the fire of the furnace proper. The connections between the plate and tank comprise a lower pipe 27 and an upper pipe 28 the former of which is connected between the bottom of the tank and the lower end of the plate and the latter of which is connected between the top of the tank and the upper end of the plate.

The water heating plate 26 is a hollow casting, as stated, extending at an inclination across the fire box between the fire pot and the outlet flue. It is located rather close to the fuel, being inclined downwardly from the front to the rear, the front end being positioned just behind the upper part of the doorway 29, and the rear end being dropped to within a few inches of the top of the fire pot. The front end of the plate has a neck or cut-out portion 30 the purpose of which is to allow convenient access to the fire pot and permit the fuel to be placed therein through the doorway, and also to prevent back flash or blow through the doorway, as when fresh fuel is put on and the door is open, by providing a rather large opening for the escape of the blow to the stack. The plate otherwise extends substantially across the whole of the dome. Said plate has numerous short pipes or flues 31 extending therethrough, and the gases or products generated by the combustion of the fuel pass through these openings, and said gases are thereby checked and evenly distributed in the combustion chamber, and in practical use will be burned in the upper part of the dome, above the plate. The checking and distributing action referred to is found to be very effective, in assuring the complete combustion of the gases evolved from the fuel, with consequent economy of operation.

The space within the furnace casing 6 and around the parts above described is completely filled with checker brick work indicated at 32. This brick work forms a support for the various flues and pipes and also for the water tank, which is completely surrounded thereby.

In the operation of the furnace, the heat radiating from the fire box and the flues is absorbed by the checker brick work and is retained and conserved thereby, and air entering through the openings 8 and passing up through the interstices of the brick work is accordingly heated and may be conducted by the service pipes 7 to the place desired. At the same time the water in the tank is heated by the circulation of the water through the plate 26 as well as by radiation in the secondary heating chamber, and the surrounding brick work serves to retain the heat in the tank, from which the usual circulation pipes extend to the radiators or other heating appliances, or to hot water supply devices.

Considering its heating power, the device is not expensive in construction, since, aside from the plate 26, no special castings or parts are required, and it can be quite readily built or erected from stock parts.

The plate 26 is attended with the advantage that it is water cooled, hence the danger of burning out or warping incident to the heat of the fire is avoided; and it is also to be noticed that said plate receives water from the tank after it is partially warmed, and not directly from the main, and consequently it will not be chilled or fractured in consequence of the flow of water directly thereto, which is a fault incident to supplying such devices directly from the cold water main. The inclination of the plate, and its connections to the water tank, allow a circulation which prevents the formation of steam in the plate.

I claim:

1. The combination of a horizontally-arranged casing containing a filling of heat retaining material, a fire box in one end of the casing and a water tank in the other, surrounded by said material, a flue extending from the fire box through said filling and around the water tank, a water heating device exposed to the fire and having circulation connections to the tank, and supply and service pipes connected to the tank.

2. The combination of a casing having a secondary heating chamber containing a filling of heat retaining material, a fire box having a flue extending through said chamber, a water tank provided with supply and service pipes and located within said chamber and surrounded by said material, and a water heating device exposed to the fire and having circulation connections to the tank.

3. A combined air and water heater comprising, in combination, a casing having air inlet and outlet openings at bottom and top respectively, and a filling of heat retaining material, a fire box therein having a tortuous flue extending through said material, a water tank within the casing and surrounded by said material and having supply and service pipes, and a water heating device located in the fire box and having circulation pipes connecting same to the tank.

4. A furnace comprising a casing having air inlets and outlets, a fire box in one end thereof, a water tank and pipe connections in the other end, a flue leading from the fire box and back and forth in the lower part of the casing under the tank, and a checker work filling in the casing.

5. A water heater comprising a casing, a fire box and water tank therein, the latter having supply and service pipes, a water heating device located within the fire box and having circulation pipe connections to the tank, and a checker work filling within the casing and around the tank.

In testimony whereof I affix my signature, in presence of two witnesses.

CLARENCE A. GIBBS.

Witnesses:
M. R. KUNSMAN,
GEO. E. TEW.